(12) United States Patent 
Vallin Spina et al.

(10) Patent No.: US 12,561,909 B2 
(45) Date of Patent: Feb. 24, 2026

(54) REAL-TIME SYSTEM FOR STREAMING WITH LIVE VOLUMETRIC CAPTURE AND ASSOCIATED METADATA

(71) Applicant: MICROSOFT TECHNOLOGY LICENSING, LLC, Redmond, WA (US)

(72) Inventors: Thiago Vallin Spina, Campinas (BR); Andréa Britto Mattos Lima, Sao Paulo (BR); Spencer G. Fowers, Duvall, WA (US); Christopher Patrick O'Dowd, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 222 days.

(21) Appl. No.: 18/211,570

(22) Filed: Jun. 19, 2023

(65) Prior Publication Data

US 2024/0420420 A1      Dec. 19, 2024

(51) Int. Cl.
*G06T 17/20* (2006.01)
*G06T 7/11* (2017.01)
*G06T 7/194* (2017.01)

(52) U.S. Cl.
CPC ............... *G06T 17/20* (2013.01); *G06T 7/11* (2017.01); *G06T 7/194* (2017.01); *G06T 2207/10024* (2013.01)

(58) Field of Classification Search
CPC . G06T 17/20; G06T 7/194; G06T 7/11; G06T 2207/10024
See application file for complete search history.

(56) References Cited

U.S. PATENT DOCUMENTS

| | | | | |
|---|---|---|---|---|
| 2011/0078055 A1* | 3/2011 | Faribault | ............ | G06Q 30/0643 |
| | | | | 705/27.2 |
| 2021/0279957 A1* | 9/2021 | Eder | .................... | G06F 18/2413 |
| 2022/0138914 A1* | 5/2022 | Wang | ..................... | G06V 10/52 |
| 2023/0102949 A1* | 3/2023 | Boyle | .................. | H04N 13/122 |
| | | | | 345/423 |
| 2023/0169716 A1* | 6/2023 | Kim | ........................ | G06T 17/20 |
| | | | | 345/423 |
| 2023/0186562 A1* | 6/2023 | Yun | ........................... | G06T 7/55 |
| | | | | 345/418 |

* cited by examiner

*Primary Examiner* — Michelle Chin
(74) *Attorney, Agent, or Firm* — David Foster; Newport IP, LLC

(57) ABSTRACT

Disclosed are systems and methods that leverage machine learning techniques to provide information about items that are on display during a live event. A 3D volumetric capture system is used to construct a 3D representation of the event in real time. For example, depth and color data from multiple perspectives may be used to construct a 3D mesh of colored polygons that represent the scene. Users may view the live event with a 3D enabled virtual reality or augmented reality headset. Background subtraction may be used to isolate items of interest. In some configurations a machine learning model may process the 3D mesh to generate a textual description of items in the scene. The textual description may then be used to search for more information about a particular item. Additionally, or alternatively, the machine learning model may directly predict one or more items in the scene.

20 Claims, 7 Drawing Sheets

3D MESH 202

DEPTH CAMERA 102C

DEPTH CAMERA 102D

IMAGES 106

BACKGROUND IMAGES 108

SCENE 140

SUBJECT 104

WATCH 130

DRESS 120

SHOES 110

DEPTH CAMERA 102B

DEPTH CAMERA 102A

ITEM MESH 132

ITEM METADATA 134

ITEM DATABASE 136

3D MESH 202

FIG. 7

REAL-TIME SYSTEM FOR STREAMING WITH LIVE VOLUMETRIC CAPTURE AND ASSOCIATED METADATA

BACKGROUND

People frequently watch live events, such as sports matches, award ceremonies, fashion shows, or concerts, from the comfort of their homes or on their mobile devices. While enjoying these live events, viewers often become intrigued by specific items of clothing or other objects they see on the screen. They may desire to learn more about the item, such as the brand, designer, price, or where they can purchase it. However, identifying and researching these items can pose a significant challenge.

One of the primary difficulties lies in the limited information available during the live broadcast. Viewers typically have access only to the visual representation of the object on their screens, without any additional context or details. This lack of context can make it challenging to accurately identify and research the desired item.

Furthermore, the fast-paced nature of live events adds another layer of complexity. Objects may appear on the screen for only a brief moment, leaving viewers with a limited timeframe to capture relevant information. Additionally, camera angles, lighting conditions, and the presence of other objects or people on the screen can further obscure or complicate the identification process.

It is with respect to these and other considerations that the disclosure made herein is presented.

SUMMARY

Disclosed are systems and methods that leverage machine learning techniques to provide information about items that are on display during a live event. A 3D volumetric capture system is used to construct a 3D representation of the event in real time. For example, depth and color data from multiple perspectives may be used to construct a 3D mesh of colored polygons that represent the scene. Users may view the live event with a 3D enabled virtual reality or augmented reality headset. Background subtraction may be used to isolate items of interest. In some configurations a machine learning model may process the 3D mesh to generate a textual description of items in the scene. The textual description may then be used to search for more information about a particular item. Additionally, or alternatively, the machine learning model may directly predict one or more items in the scene.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 7 is a diagram illustrating a distributed computing environment capable of implementing aspects of the techniques and technologies presented herein.

DETAILED DESCRIPTION

Figure 1:
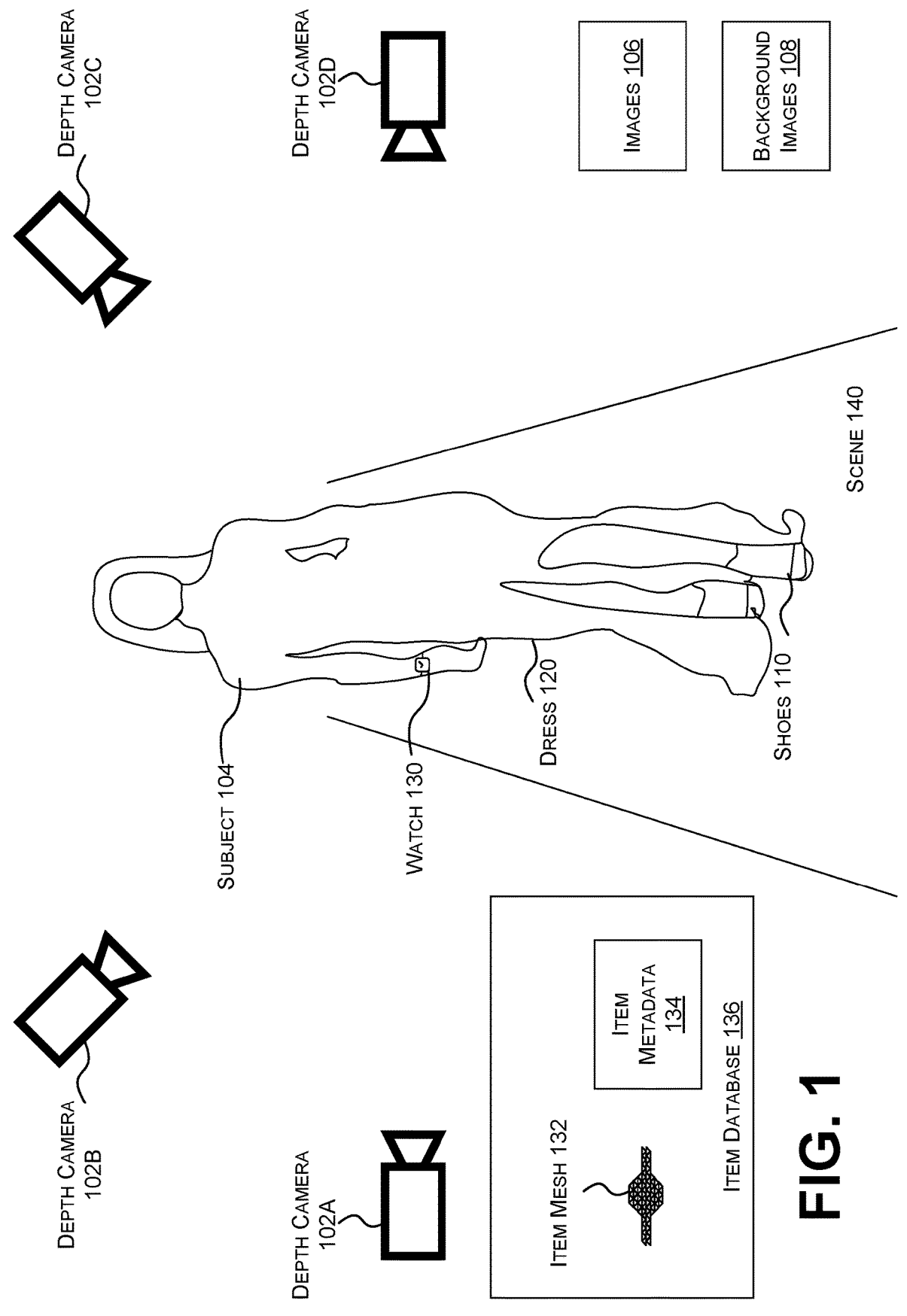
FIG. 1 illustrates multiple depth cameras capturing images of a subject.

FIG. 1 illustrates multiple depth cameras 102 capturing images 106 of a subject 104. Depth cameras 102 may be positioned by a series of arch-like and/or tower structures positioned along a scene 140. Subject 104 may be a runway model, a celebrity at a red-carpet event, an athlete at a sporting event, a musician performing at a concert, or any other performer at a live event. Scene 140 represents the area in which subject 104 is filmed, such as a fashion runway. Cameras 102 may capture background images 108 of scene 140 before subject 104 enters the field of view. Background images 108 may be used to distinguish which portions of images 106 are part of the background and which portions are not.

Subject 104 may be adorned with one or more items such as shoes 110, dress 120, and watch 130. Viewers of the event may want to learn more about items worn by subject 104, such as the brand of clothing, the model of watch, etc. Many fans look up to celebrities as style icons and seek inspiration from their outfits. Knowing what a celebrity is wearing can provide ideas for their own fashion choices and help them stay updated with the latest trends. Fans may also be genuinely interested in the style choices of their favorite celebrity. Celebrities may be invested in displaying fashion choices effectively as part of a brand promotion: celebrities often collaborate with fashion brands and designers, and their outfit choices can serve as a form of promotion for those brands.

Depth cameras, also known as depth sensors or depth perception cameras, are devices that capture and measure the depth information of a scene. Unlike regular cameras that only capture color or grayscale images, depth cameras provide additional depth or distance data for each pixel in the image. This depth information allows for the creation of 3D representations of the scene or objects within it.

Depth cameras use various technologies to capture depth information, including: Time-of-Flight (ToF), Structured Light, and Stereo Vision. Depth cameras 102 may use any of these techniques to generate per-pixel depth information. Depth cameras 102 also capture image data, i.e., per-pixel color data.

Time of Flight cameras emit light or infrared signals and measure the time it takes for the signal to bounce back to the camera. By calculating the time delay, the camera can determine the distance between the camera and objects in the scene.

Structured light cameras project a pattern of light onto the scene and analyze the distortion of the pattern as it interacts with objects. This distortion is used to calculate depth information based on the known pattern.

Stereo cameras use two or more camera lenses to capture the same scene from slightly different angles. By comparing the disparities between the images, the depth information can be computed using triangulation techniques.

Depth cameras 102 vary in their capabilities and/or configurations. For example, depth cameras 102 may vary in their resolution, whether they capture still images or video, aspect ratio, or the like. For instance, Depth cameras 102A and 102D may have a different resolution than depth cameras 102B and 102C. Higher definition cameras may be strategically located where subject 104 is likely to pause, such as at the end of a fashion runway or center stage of a music performance. This may provide a higher quality image when users have a good view of subject 104, and when searching for items on the subject.

In some configurations, a brand manager wishing to promote an item may generate a 3D item mesh 132 of the item 130 for inclusion in an item database 136. This may be done before live capture of subject 104 begins, and serves to identify potential items ahead of time. For example, item mesh 132 is a 3D model of watch 130. Item mesh 132 may be captured by depth cameras 102 or a similar camera setup. Item metadata 134 may include specifications of the item such as dimensions, materials, color, cost, color availability, sustainability during manufacturing, the designer, the brad, a description, a link to purchase, or other information that may be relevant to a user. Item metadata may be provided by the manufacturer of item mesh 132, or item metadata 134 may be derived from an image analysis of the item.

Figure 2:
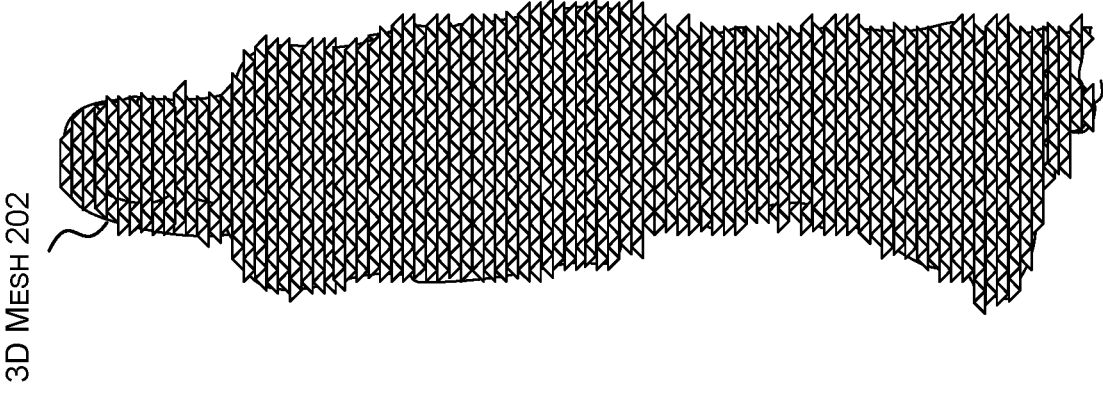
FIG. 2 illustrates a 3D mesh generated from depth camera image data.

FIG. 2 illustrates a 3D mesh 202 generated from depth camera image data. 3D mesh 202 is depicted with triangles, but any polygon or combination of polygons may similarly be used to describe the contour of subject 104. 3D mesh 202 may be generated in real-time, as subject 104 moves about the scene.

Figure 3:
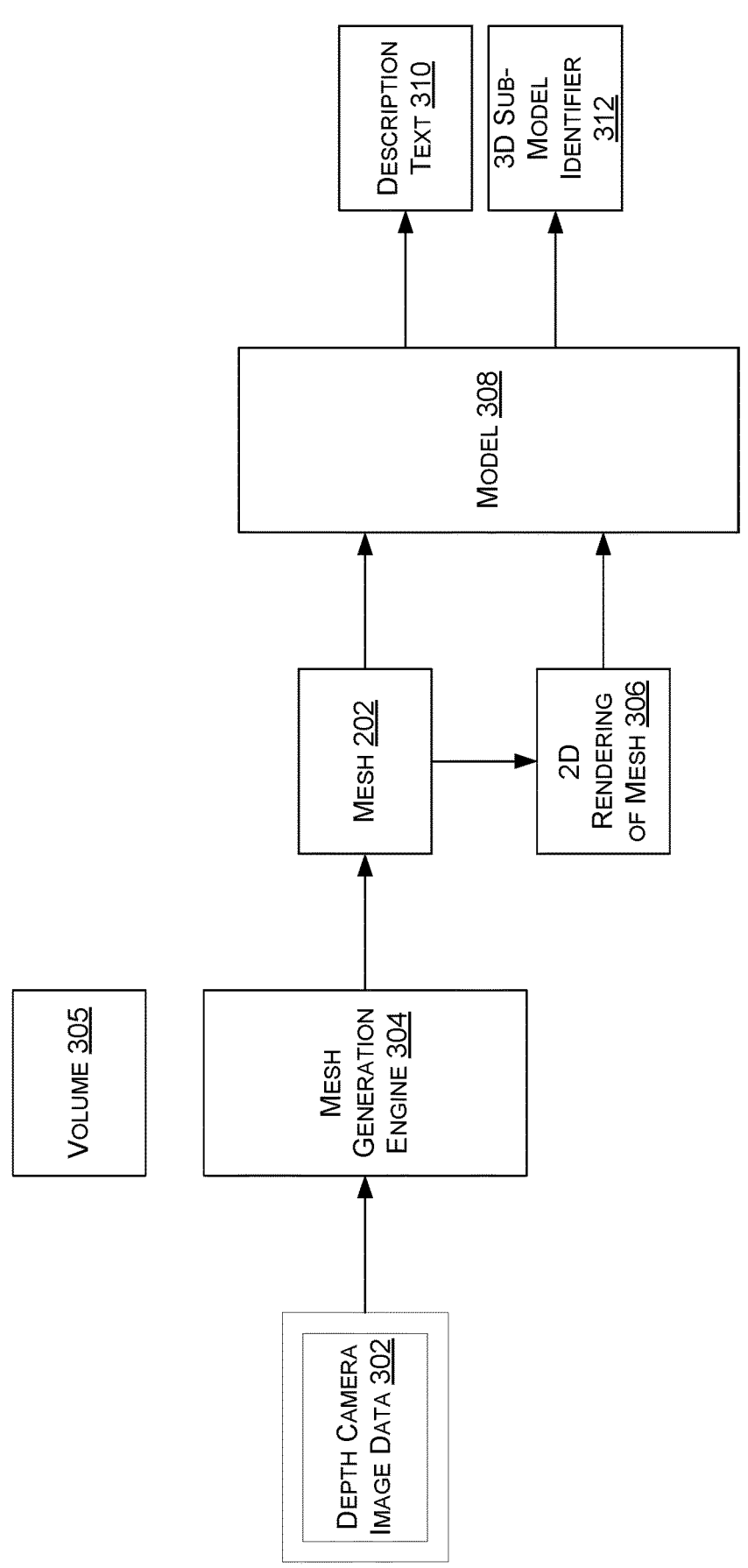
FIG. 3 illustrates a processing pipeline for generating descriptions of items found within a 3D mesh.

FIG. 3 illustrates a processing pipeline for generating descriptions 310 of items found within 3D mesh 202. Depth camera image data 302 comprises arrays of pixels from the fields of view of each of depth cameras 102. Depth camera image data 302 may also include per-pixel depth information that represents the distance from the camera the object represented by that pixel.

Mesh generation engine 304 processes depth camera image data 302 to generate mesh 202. Mesh generation engine 304 first optionally removes pixels that represent the background of scene 140. For example, mesh generation engine 304 may compare the depth and color of pixels from image 106 to the corresponding pixels of the corresponding background image 108. Pixels that match in color and/or depth may be ignored as part of the background of scene 140.

Mesh generation engine 304 may then construct a volume 305 of subject 104 within the scene 140. Volumes are constructed by determining a color of one or more voxels within the space of scene 140. The term voxel is derived from "volumetric pixel" and represents a three-dimensional equivalent of a pixel in two-dimensional images. Voxels are determined by constructing a vector for each pixel of each image 106. Each vector indicates the location and orientation of light as it travels to a pixel of one of images 106. A voxel is determined to exist at the intersection of vectors that are associated with different camera locations.

Once volume 305 has been generated, mesh 202 is constructed by fitting a mesh of polygons to the surface of the volume. Each polygon may include a definition of edges and/or vertices within the space of scene 140. Each polygon may also be associated with a color, brightness, orientation, and/or translucence. The size, number, and type of polygons used to construct mesh 202 may be configured automatically or manually. For example, the number of polygons may be limited to accommodate a number of tokens that model 308 may process at once. In some configurations, mesh generation engine 304 may scale down mesh 202, i.e., reduce the number of polygons used.

In some configurations, mesh 202 is provided to model 308 to infer a description of one or more items. When model 308 is a large language mode, mesh 202 may be provided as comma delimited sets of values vertices and colors, such as "[[0.32, 3.2, 123.1], [5.43, 2.19, 4.32], [3.1, 2.3, 4.2], [233, 221, 134]]". In this example, the first three sets of numbers each represent a coordinate of a triangle in the 3D space of scene 140. The last set of whole numbers represents a color in RGB format. Mesh 202 may comprise hundreds, thousands, or more polygons encoded in this way. Mesh 202 may be provided to model 308 in conjunction with a system message, user-provided prompt, or other prompt that indicates a region of mesh 202 to focus on, a type of item to identify, etc.

In some configurations, mesh 202 is pre-processed into segments, and one or more of the segments are provided to ML model 308 for processing. For example, a segment anything model may be used to segment portions of mesh 202 into identifiable objects, such as watch 130 or shoes 110. One or more of these objects may be provided to ML model 308 in turn in order to obtain written descriptions of each item.

Additionally, or alternatively, 2D renderings 306 of mesh 202 may be generated from various perspectives of mesh 202. A 2D rendering is generated by projecting mesh 202 onto a viewport, generating pixel values based on mesh 202, a light source, and other factors known to the field of 3D rendering. In this way, 2D rendering 306 is generated in a manner similar rendering a 3D video game on a display. 2D rendering 306 may then be provided as input to machine learning model 308. 2D renderings 306 may be generated and provided to ML model 308 as a way to manage the size of the input to ML model 308 or as a technique for focusing available model resources on particular angles or other features of subject 104.

ML model 308 may be any machine learning model that is trained on 3D meshes and 2D renderings of 3D meshes, and which predicts a textual description of one or more items on subjects 104. ML model 308 may be a large language model, enabling it to receive mesh 202 and/or 2D rendering 306 encoded as text. However, any other type of machine learning model is similarly contemplated.

Figure 4:
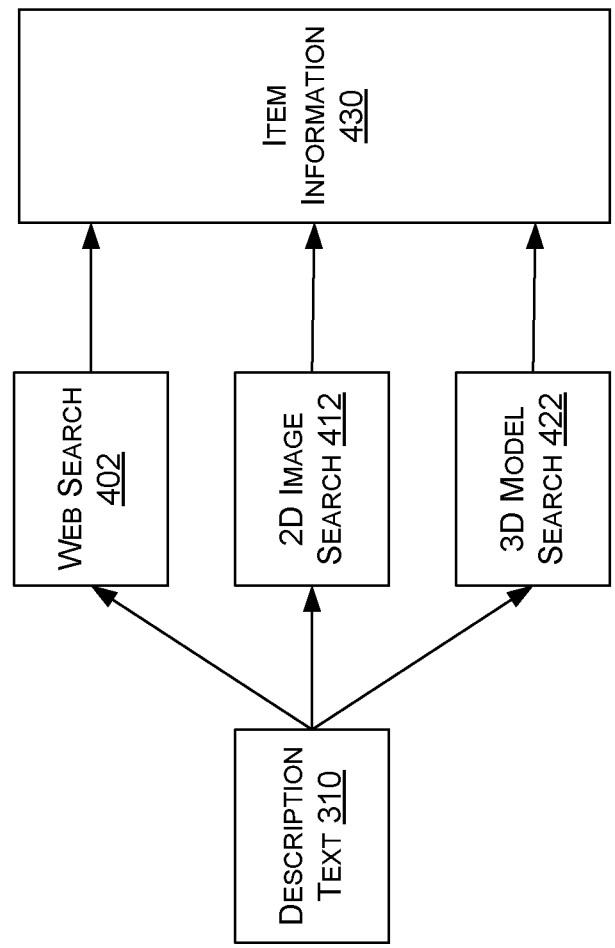
FIG. 4 illustrates using an item description to obtain information about that item.

FIG. 4 illustrates using description text 310 of an item to obtain item information 430 about that item. Description text 310 was received from ML model 308 and includes one or more descriptions of items that were identified on subject 104 of scene 140. Description text 310 may be provided to a web search 402, a 2D image search 412, a 3D image search 422, or the like.

When provided to web search 402, description text 310 return item information such as brand name, the designer, the country of origin, and other publicly available information. When provided to 2D image search 412, description text 310 may return a 2D image of the item as well as any metadata associated with the 2D image. When provided to 3D model search 422, item metadata 134, which may have been created by the brand manager of the item, may be returned.

Figure 5:
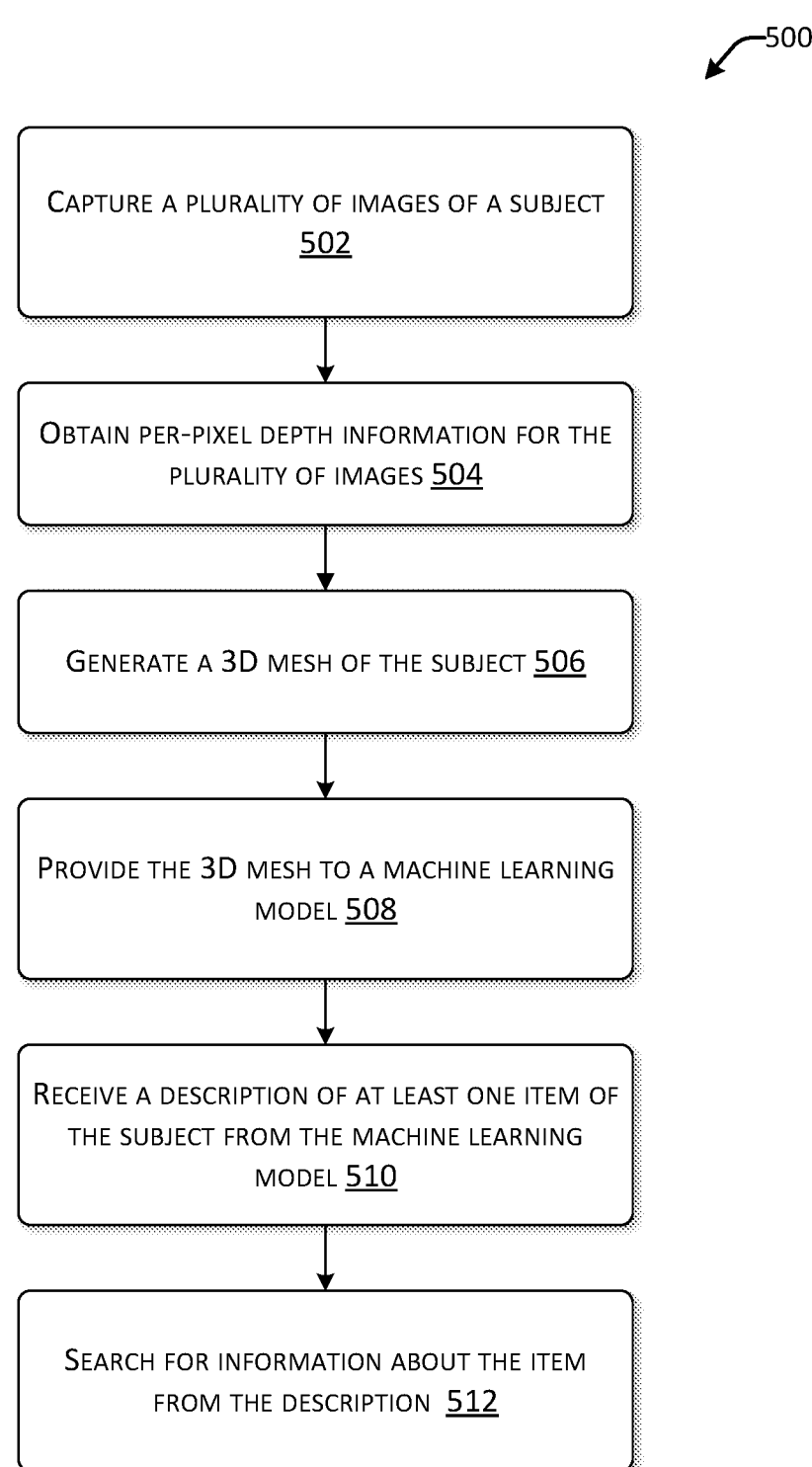
FIG. 5 is a flow diagram of an example method for streaming live volumetric capture and associated metadata.

With reference to FIG. 5, routine 500 begins at operation 502, where a plurality of images 106 of a subject 104 are captured by depth cameras 102.

Next at operation 504, per-pixel depth information 302 is obtained from images 106.

Next at operation 506, a 3D mesh 202 of the subject 104 is generated from the per-pixel depth information 302.

Next at operation 508, the 3D mesh 202, or a portion thereof, is provided to a machine learning model 308.

Next at operation 510, a description 310 of at least item 130 of subject 104 if received from machine learning model 308.

Next at operation 512, a search is performed for information about the item based on the description 310.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routines 500 may be also implemented in many other ways. For example, the routine 500 may be implemented, at least in part, by a processor of another remote computer or a local circuit. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Figure 6:
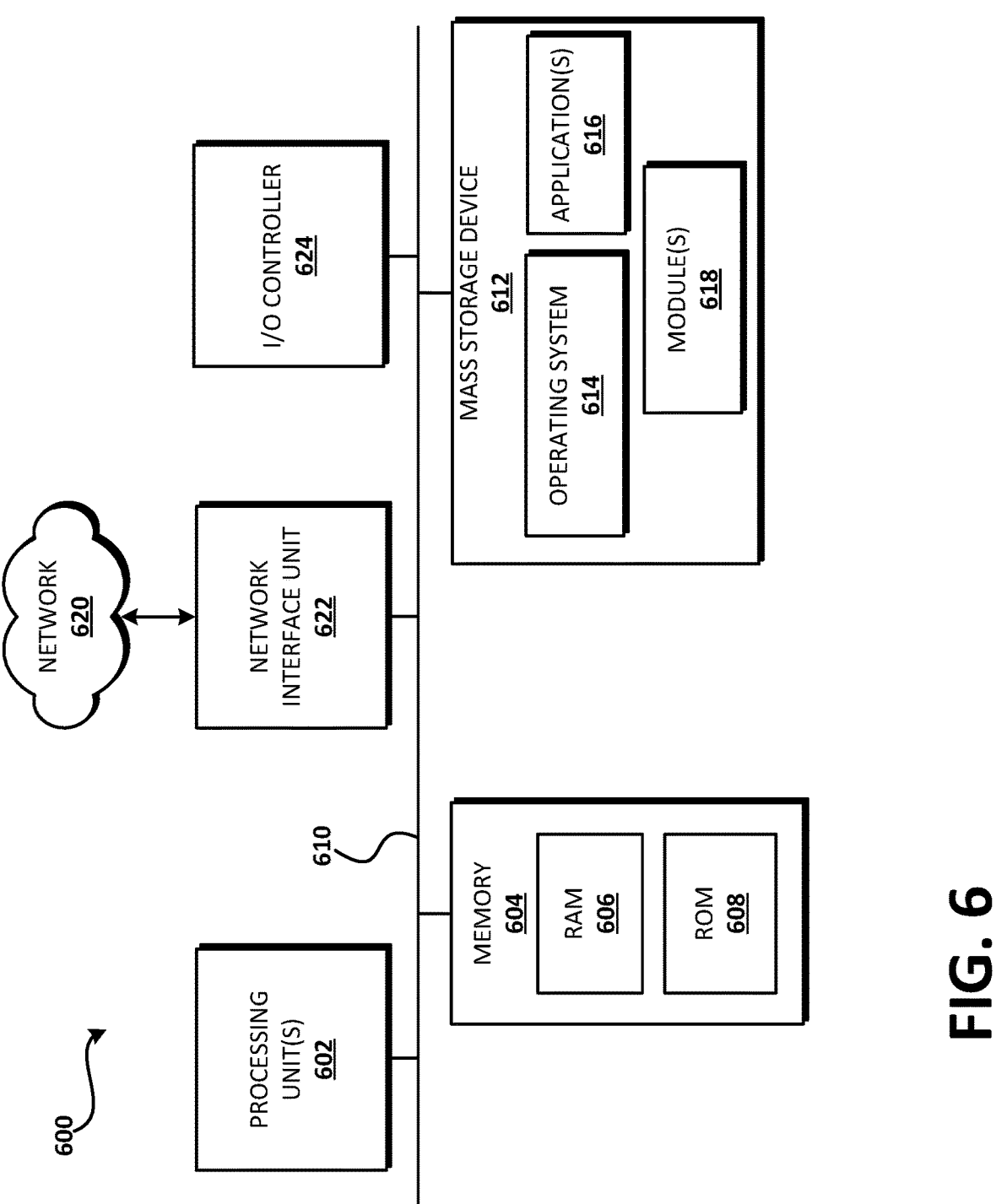
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, such as a computer or a server configured as part of the systems described herein, capable of executing computer instructions (e.g., a module or a program component described herein). The computer architecture 600 illustrated in FIG. 6 includes processing unit(s) 602, a system memory 604, including a random-access memory 606 ("RAM") and a read-only memory ("ROM") 608, and a system bus 610 that couples the memory 604 to the processing unit(s) 602.

Processing unit(s), such as processing unit(s) 602, can represent, for example, a CPU-type processing unit, a GPU-type processing unit, a neural processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing unit(s) 602 through a mass storage controller connected to the bus 610. The mass storage device 612 and its associated computer-readable media provide non-volatile storage for the computer architecture 600. Although the description of computer-readable media contained herein refers to a mass storage device, it should be appreciated by those skilled in the art that computer-readable media can be any available computer-readable storage media or communication media that can be accessed by the computer architecture 600.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

It should be appreciated that the software components described herein may, when loaded into the processing unit(s) 602 and executed, transform the processing unit(s) 602 and the overall computer architecture 600 from a general-purpose computing system into a special-purpose computing system customized to facilitate the functionality presented herein. The processing unit(s) 602 may be constructed from any number of transistors or other discrete circuit elements, which may individually or collectively assume any number of states. More specifically, the processing unit(s) 602 may operate as a finite-state machine, in response to executable instructions contained within the software modules disclosed herein. These computer-executable instructions may transform the processing unit(s) 602 by specifying how the processing unit(s) 602 transition between states, thereby transforming the transistors or other discrete hardware elements constituting the processing unit(s) 602.

Figure 7:
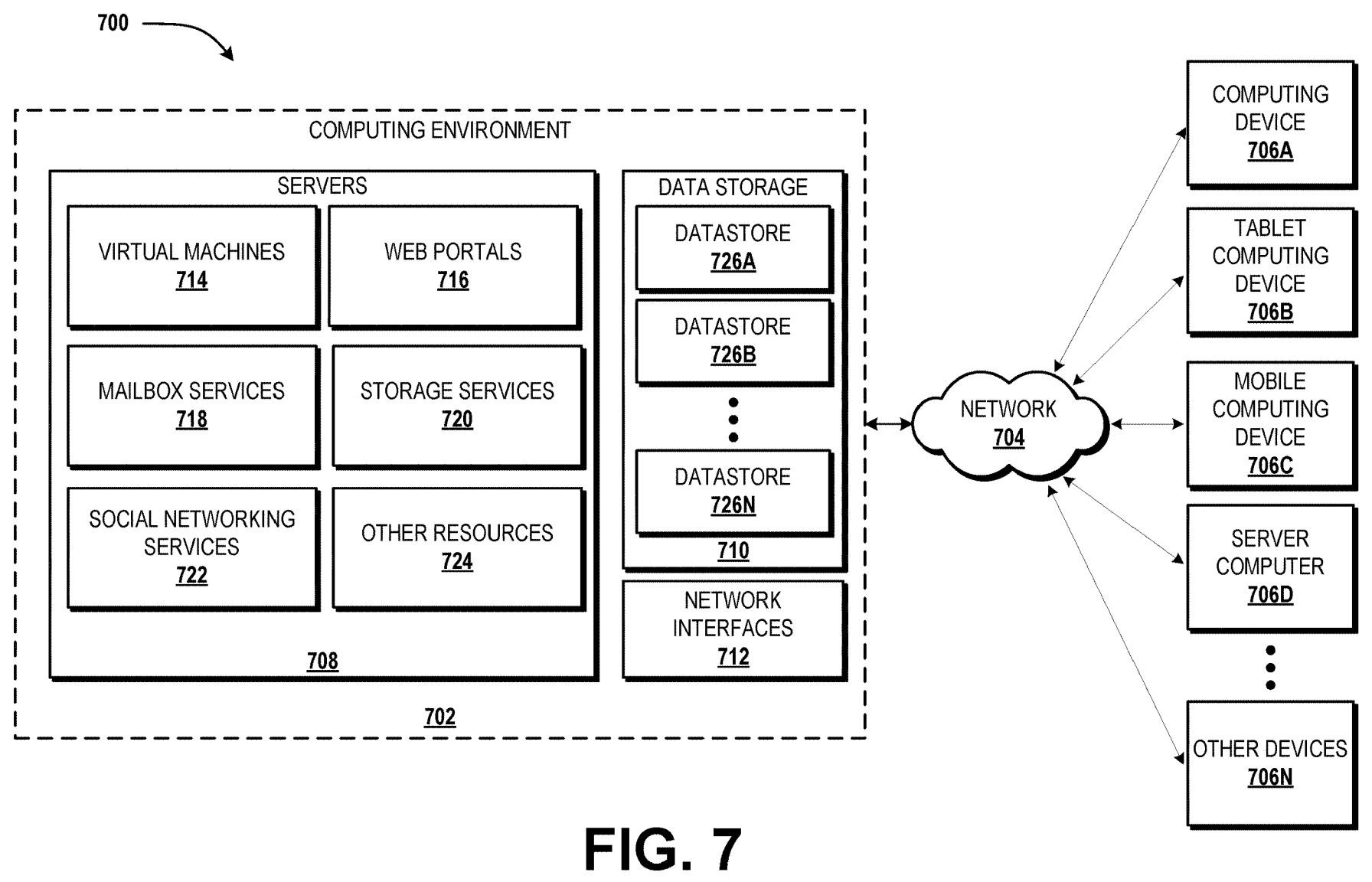

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "clients 706" and also referred to herein as computing devices 706) can communicate with the computing environment 702 via the network 704. In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702.

In various examples, the computing environment 702 includes servers 708, data storage 710, and one or more network interfaces 712. The servers 708 can host various services, virtual machines, portals, and/or other resources. In the illustrated configuration, the servers 708 host virtual machines 714, Web portals 716, mailbox services 718, storage services 720, and/or, social networking services 722. As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 702. The data storage 710 can include, host, or provide one or more real or virtual datastores 726A-726N (hereinafter referred to collectively and/or generically as "datastores 726"). The datastores 726 are configured to host data used or created by the servers 708 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including, but not limited to, the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

The present disclosure is supplemented by the following example clauses:

Example 1: A method comprising: capturing a plurality of images of a subject; obtaining per-pixel depth information for the plurality of images; generating a 3D mesh of the subject based on the per-pixel depth information and color information of the plurality of images; providing the 3D mesh to a machine learning model; receiving a description of at least one item of the subject from the machine learning model; and searching for information about the item from the description.

Example 2: The method of Example 1, wherein the 3D mesh is encoded as a string of numbers that designate spatial coordinates and colors, wherein the machine learning model comprises a large language model, and wherein the 3D mesh is provided to the large language model as the string of numbers.

Example 3: The method of Example 1, wherein the plurality of images are captured by a plurality of cameras that are directed to a scene, further comprising: capturing a plurality of background images of the scene without the subject; and performing background subtraction on the plurality of images in part by removing pixels from one of the plurality of images that match corresponding pixels in a corresponding one of the plurality of background images.

Example 4: The method of Example 1, wherein the 3D mesh comprises plurality of colored polygons.

Example 5: The method of Example 1, further comprising: segmenting the 3D mesh into a plurality of sub-meshes, wherein the 3D mesh provided to the machine learning model comprises at least one of the plurality of sub-meshes.

Example 6: The method of Example 1, wherein the 3D mesh is provided to the ML model in conjunction with a prompt asking to identify items of the subject.

Example 7: The method of Example 1, wherein information about the item is searched for by submitting the description to a web search, an 2D image search, or a 3D image search.

Example 8: A system comprising: a processing unit; and a computer-readable storage medium having computer-executable instructions stored thereupon, which, when executed by the processing unit, cause the processing unit to: capture a plurality of images of a subject modeling an item; obtain per-pixel depth information for the plurality of images; generate a 3D mesh of the subject based on the per-pixel depth information and color information of the plurality of images; provide the 3D mesh to a machine learning model; receive a description of the item modeled by the subject from the machine learning model; and search for information about the item from the description.

Example 9: The system of Example 8, wherein the plurality of images are captured with a plurality of depth cameras that are directed to a scene.

Example 10: The system of Example 8, wherein the plurality of images are captured at the same time.

Example 11: The system of Example 8, wherein the item comprises an item of clothing or a fashion accessory.

Example 12: The system of Example 8, further comprising: generating a 3D model of the item; and providing the 3D model of the item to a client device.

Example 13: The system of Example 12, further comprising: providing a link where the item or a similar item may be purchased.

Example 14: The system of Example 8, wherein information about the item is searched for by providing the description to a search engine.

Example 15: A computer-readable storage medium having encoded thereon computer-readable instructions that when executed by a processing unit causes a system to: capture a plurality of images of a subject; obtain per-pixel depth information for the plurality of images; generate a 3D mesh of the subject based on the per-pixel depth information and color information of the plurality of images; generate a plurality of 2D renderings of 3D mesh; provide the 2D renderings to a machine learning model; receive a description of at least one item modeled by the subject from the machine learning model; and search for information about the item from the description.

Example 16: The computer-readable storage medium of Example 15, wherein the 3D model is provided as input to the machine learning model with the 2D renderings.

Example 17: The computer-readable storage medium of Example 15, wherein the model is refined on training data comprising a plurality of 3D mesh representations of items and corresponding descriptions.

Example 18: The computer-readable storage medium of Example 15, further comprising:
broadcasting the 3D mesh to client devices.

Example 19: The computer-readable storage medium of Example 16, further comprising: receiving an indication of a user selection of a location on the 3D mesh; segmenting the 3D mesh into a plurality of segments; identifying a segment of the 3D mesh that encloses the location, wherein providing the 3D mesh to the machine learning model comprises providing the segment of the 3D mesh to the machine learning model.

Example 20: The computer-readable storage medium of Example 15, wherein the 3D mesh is generated based on a volume computed from intersections of per-pixel depth information obtained from different cameras.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
capturing a plurality of images of a subject;
obtaining per-pixel depth information for the plurality of images;
generating a 3D mesh of the subject based on the per-pixel depth information and color information of the plurality of images;
generating a 2D rendering of the 3D mesh that includes the subject;
providing the 3D mesh and the 2D rendering of the 3D mesh to a machine learning model;
receiving a description of at least one item of the subject from the machine learning model; and
searching for information about the item from the description.

2. The method of claim 1, wherein the 3D mesh is encoded as a string of numbers that designate spatial coordinates and colors, wherein the machine learning model comprises a large language model, and wherein the 3D mesh is provided to the large language model as the string of numbers.

3. The method of claim 1, wherein the plurality of images are captured by a plurality of cameras that are directed to a scene, further comprising:
capturing a plurality of background images of the scene without the subject; and
performing background subtraction on the plurality of images in part by removing pixels from one of the plurality of images that match corresponding pixels in a corresponding one of the plurality of background images.

4. The method of claim 1, wherein the 3D mesh comprises plurality of colored polygons.

5. The method of claim 1, further comprising:
segmenting the 3D mesh into a plurality of sub-meshes, wherein the 3D mesh provided to the machine learning model comprises at least one of the plurality of sub-meshes.

6. The method of claim 1, wherein the 3D mesh is provided to the ML model in conjunction with a prompt asking to identify items of the subject.

7. The method of claim 1, wherein information about the item is searched for by submitting the description to a web search, a 2D image search, or a 3D image search.

8. A system comprising:
a processing unit; and
a computer-readable storage medium having computer-executable instructions stored thereupon, which, when executed by the processing unit, cause the processing unit to:
capture a plurality of images of a subject modeling an item;
obtain per-pixel depth information for the plurality of images;

12 generate a 3D mesh of the subject based on the per-pixel depth information and color information of the plurality of images;
generate a 2D rendering of the 3D mesh that includes the subject provide the 3D mesh and the 2D rendering of the 3D mesh to a machine learning model;
receive a description of the item modeled by the subject from the machine learning model; and
search for information about the item from the description.

9. The system of claim 8, wherein the plurality of images are captured with a plurality of depth cameras that are directed to a scene.

10. The system of claim 8, wherein the plurality of images are captured at the same time.

11. The system of claim 8, wherein the item comprises an item of clothing or a fashion accessory.

12. The system of claim 8, further comprising:
generating a 3D model of the item; and
providing the 3D model of the item to a client device.

13. The system of claim 12, further comprising:
providing a link where the item or a similar item may be purchased.

14. The system of claim 8, wherein information about the item is searched for by providing the description to a search engine.

15. A computer-readable storage medium having encoded thereon computer-readable instructions that when executed by a processing unit causes a system to:
capture a plurality of images of a subject;
obtain per-pixel depth information for the plurality of images;
generate a 3D mesh of the subject based on the per-pixel depth information and color information of the plurality of images;
generate a plurality of 2D renderings of 3D mesh;
provide the 2D renderings to a machine learning model;
receive a description of at least one item modeled by the subject from the machine learning model; and
search for information about the item from the description.

16. The computer-readable storage medium of claim 15, wherein the 3D model is provided as input to the machine learning model with the 2D renderings.

17. The computer-readable storage medium of claim 16, further comprising:
receiving an indication of a user selection of a location on the 3D mesh;
segmenting the 3D mesh into a plurality of segments; and
identifying a segment of the 3D mesh that encloses the location, wherein providing the 3D mesh to the machine learning model comprises providing the segment of the 3D mesh to the machine learning model.

18. The computer-readable storage medium of claim 15, wherein the model is refined on training data comprising a plurality of 3D mesh representations of items and corresponding descriptions.

19. The computer-readable storage medium of claim 15, further comprising:
broadcasting the 3D mesh to client devices.

20. The computer-readable storage medium of claim 15, wherein the 3D mesh is generated based on a volume computed from intersections of per-pixel depth information obtained from different cameras.

* * * * *